(12) United States Patent
Haruta et al.

(10) Patent No.: US 9,080,027 B2
(45) Date of Patent: Jul. 14, 2015

(54) HEAT-SHRINKABLE POLYESTER FILM, PACKAGES, AND PROCESS FOR PRODUCTION OF HEAT-SHRINKABLE POLYESTER FILM

(75) Inventors: Masayuki Haruta, Tsuruga (JP); Yukinobu Mukoyama, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 13/635,258

(22) PCT Filed: Mar. 8, 2011

(86) PCT No.: PCT/JP2011/055297
§ 371 (c)(1),
(2), (4) Date: Sep. 14, 2012

(87) PCT Pub. No.: WO2011/114934
PCT Pub. Date: Sep. 22, 2011

(65) Prior Publication Data
US 2013/0008821 A1    Jan. 10, 2013

(30) Foreign Application Priority Data

Mar. 15, 2010    (JP) .................................. 2010-057380

(51) Int. Cl.
| | |
|---|---|
| *C08G 63/183* | (2006.01) |
| *B29C 55/14* | (2006.01) |
| *B65D 65/22* | (2006.01) |
| *C08J 5/18* | (2006.01) |

(52) U.S. Cl.
CPC ................ *C08J 5/18* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 8,673,414 B2 | 3/2014 | Haruta et al. | |
| 2009/0304997 A1 | 12/2009 | Haruta et al. | |
| 2010/0247845 A1 | 9/2010 | Haruta et al. | |
| 2010/0331513 A1* | 12/2010 | Kim et al. ..................... | 528/272 |
| 2012/0043248 A1 | 2/2012 | Haruta et al. | |

FOREIGN PATENT DOCUMENTS

| | | | |
|---|---|---|---|
| CN | 101573400 B | 12/2011 | |
| CN | 102448705 A | 5/2012 | |
| EP | 1500489 A1 | 1/2005 | |
| EP | 2058357 A1 | 5/2009 | |
| EP | 2258538 A1 | 12/2010 | |
| EP | 2436508 A1 | 4/2012 | |
| JP | 2003-041018 A | 2/2003 | |
| JP | 2005-097490 A | 4/2005 | |
| JP | 2007-016120 A | 1/2007 | |
| JP | 2007-056156 A | 3/2007 | |
| JP | 2007-196680 A | 8/2007 | |
| JP | 2008-280370 A | 11/2008 | |
| JP | 2009-160788 A | 7/2009 | |
| JP | 2009-202445 A | 9/2009 | |
| JP | 2009-226940 A | 10/2009 | |
| JP | 2009-227970 A | 10/2009 | |
| WO | WO 2009/041408 A1 | 4/2009 | |
| WO | WO 2009/107591 A1 | 9/2009 | |

OTHER PUBLICATIONS

English Translation of Haruta et al. (JP 2009-202445), Sep. 2009.*
European Patent Office, Extended European Search Report in European Patent Application No. 11756123.3 (Aug. 21, 2013).
Sakauchi et al., *Molding Technique*, 21(6): 336-345 (2009).
Japanese Patent Office, International Search Report in International Patent Application No. PCT/JP2011/055297 (Apr. 12, 2011).
The International Bureau of WIPO, International Preliminary Report on Patentability in International Patent Application No. PCT/JP2011/055297 (Oct. 23, 2012).
European Patent Office, Communication Pursuant to Article 94(3) EPC in European Patent Application No. 11756123.3 (Apr. 1, 2014).
Chinese Patent Office, Office Action in Chinese Patent Application No. 201180013836 (Jul. 7, 2014).
Taiwan Patent Office, Notification for The Opinion of Examination in Taiwanese Patent Application No. 100108459 (Jan. 23, 2015).

* cited by examiner

*Primary Examiner* — Ronak Patel
(74) *Attorney, Agent, or Firm* — Leydig, Voit & Mayer, Ltd.

(57) ABSTRACT

Disclosed is a heat-shrinkable polyester film which, even when stored in an outside warehouse which is not temperature-controlled during a hot summer, does not result in the film shrinking (so-called natural shrinkage); which further has a low decrease in shrinkage rate in the main shrinkage direction, and which can be attached aesthetically and efficiently without changing the temperature conditions for causing heat shrinkage when attaching as a label by heat-shrinking the same to a container (e.g., a plastic bottle). The disclosed heat-shrinkable polyester film comprises a polyester resin having ethylene terephthalate as a main component and containing at least 7 mol % of at least one monomer capable of forming an amorphous component in the whole component of polyester resin. In the heat-shrinkable polyester film, the 80° C.-120° C. glycerin shrinkage, the natural shrinkage rate after high temperature aging, and the number of initial break age after high-temperature aging are adjusted within a specific range.

18 Claims, No Drawings

HEAT-SHRINKABLE POLYESTER FILM, PACKAGES, AND PROCESS FOR PRODUCTION OF HEAT-SHRINKABLE POLYESTER FILM

CROSS-REFERENCE TO RELATED APPLICATIONS

This patent application is the U.S. national phase of International Patent Application PCT/JP2011/055297, filed on Mar. 8, 2011, which claims the benefit of Japanese Patent Application No. 2010-057380, filed on Mar. 15, 2010, which are incorporated by reference in their entireties herein.

TECHNICAL FIELD

The present invention relates to a heat-shrinkable polyester film and a package, and specifically relates to a heat-shrinkable polyester film which is suitable for label use and has a reduced physical properties change by aging, and a package to which a label is attached.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

Further, as a heat-shrinkable film, a film is generally utilized which greatly shrinks in the width direction in terms of handleability in label production. Hence, the conventional heat-shrinkable polyester film has been produced by drawing at a high ratio in the width direction in order to exhibit a sufficient shrinkage force in the width direction at heating.

However, there is a problem that the heat-shrinkable polyester film, when stored in an outside warehouse which is not temperature-controlled during a hot summer, results in the film shrinking (so-called natural shrinkage), leading to a reduction in product width. There is another problem that when the heat-shrinkable polyester film is stored in a hot warehouse similarly, the shrinkage rate in the main shrinkage direction decreases, so that the film cannot be attached aesthetically and efficiently unless temperature conditions for causing heat shrinkage are changed when attaching the film by heat-shrinking the same to a container such as a PET bottle after label-cutting. Therefore, the heat-shrinkable polyester film is generally stored at a low temperature of not more than 25° C. However, storage at a low temperature during a summer or the like is not desirable in terms of delivery, costs and recent environmental issues.

It is reported in Non-Patent Document 1 that the dimensional stability (so-called natural shrinkage rate) under storage at 30° C. or 40° C. is improved if heat treatment conditions after drawing are optimized such that the temperature is in a range of 80° C. to 95° C. and the relaxation rate in the width direction is not less than 10%. However, a change in shrinkage rate after storage is unknown, and it is unknown whether a natural shrinkage rate and a change in shrinkage rate are satisfactory when the film is stored at a higher temperature (e.g. 60° C.).

PRIOR ART DOCUMENT

Non-Patent Document

Non-Patent Document 1: Kunio Sakauchi, four others, "Influence of Heat Treatment on Shrinkage Behaviors of Tubular Biaxially Oriented Film of Ethylene Random Copolypropylene", Molding Technique, Vol. 21, No. 6, 2009.

DISCLOSURE OF THE INVENTION

Problem to be Solved by the Invention

The present invention solves the above-mentioned problems of conventional heat-shrinkable polyester films to provide a heat-shrinkable polyester film which, even when stored in an outside warehouse which is not temperature-controlled during a hot summer, does not result in the film shrinking (so-called natural shrinkage), which has a low decrease in shrinkage rate in the main shrinkage direction, and which can be attached aesthetically and efficiently without changing the temperature conditions for causing heat shrinkage when attaching as a label by heat-shrinking the same to a container such as a PET bottle.

The present inventors keenly studied to solve the above-described problems and as a result, they completed the present invention at last. That is, the present invention is configured as follows.

Means for Solving the Problem

1. A heat-shrinkable polyester film made of a polyester resin comprising ethylene terephthalate as a main constituent and containing at least 7 mol % of at least one monomer capable of forming an amorphous component in the whole component of the polyester resin, wherein the following requirements (1) to (5) are satisfied:

(1) a glycerin shrinkage rate in the width direction is not more than 10% when the film is treated for 10 seconds in glycerin at 80° C.;

(2) a glycerin shrinkage rate in the longitudinal direction is not less than 0% and not more than 10% and a glycerin shrinkage rate in the width direction is not less than 20% and not more than 40% when the film is treated for 10 seconds in glycerin at 100° C.;

(3) a glycerin shrinkage rate in the width direction is not less than 40% and not more than 70% when the film is treated for 10 seconds in glycerin at 120° C.;

(4) a shrinkage rate of the film in the width direction after aging for 672 hours under an atmosphere of a temperature of 60° C. and a relative humidity of 40% (so-called natural shrinkage rate) is not more than 1.5%; and (5) the number of initial breakages, which is the number of samples are broken at not more than 5% elongation when a tensile test is repeated 10 times in the film longitudinal direction using a tensile tester with a distance between chucks being kept at 100 mm after aging for 672 hours under an atmosphere of a temperature of 60° C. and a relative humidity of 40%, is not more than 2 times.

2. The heat-shrinkable polyester film described in the first, wherein a tensile breaking strength in the longitudinal direction is not less than 80 MPa and not more than 300 MPa.

3. The heat-shrinkable polyester film described in the first or second, wherein a difference is not more than 10% between the glycerin shrinkage rate of the film in the width direction when the film is treated for 10 seconds in glycerin at each of temperatures of 80° C., 100° C. and 120° C. after aging for 672 hours under an atmosphere of a temperature of 60° C. and a relative humidity of 40% and the glycerin shrinkage rate at the same temperature for the film before aging.

4. The heat-shrinkable polyester film described in any one of the first to third, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %.

5. The heat-shrinkable polyester film described in any one of the first to fourth, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

6. A process for producing the heat-shrinkable polyester film of any one of the first to fifth using an undrawn polyester film made of a polyester resin comprising ethylene terephthalate as a main constituent and containing at least 7 mol % of at least one monomer capable of forming an amorphous component in the whole component of the polyester resin, wherein the process comprises a step of carrying out lengthwise drawing, followed by transverse drawing and then carrying out a final heat treatment at a temperature of the transverse drawing temperature+not less than 15° C. and not more than 40° C.

7. The process for producing a heat-shrinkable polyester film described in sixth, comprising:

(a) a lengthwise drawing step of lengthwise drawing an undrawn film so as to provide a total lengthwise draw ratio of not less than 2.8 times and not more than 4.5 times by lengthwise drawing the film in the longitudinal direction at a draw ratio of not less than 2.2 times and not more than 3.0 times at a temperature of not less than Tg and not more than (Tg+30° C.) (first-stage lengthwise drawing) and then lengthwise drawing the film in the longitudinal direction at a draw ratio of not less than 1.2 times and not more than 1.5 times at a temperature of not less than (Tg+10° C.) and not more than (Tg+40° C.);

(b) an annealing step of relaxing the film after lengthwise drawing at a relaxation rate of not less than 10% and not more than 50% in the longitudinal direction while heating the film in the width direction using an infrared heater;

(c) an intermediate heat treatment step of heat-treating the film after annealing for a time period of not less than 1.0 seconds and not more than 9.0 seconds at a temperature of not less than 130° C. and not more than 190° C. with both edges in the width direction being held by clips in a tenter;

(d) a forced cooling step of actively cooling the film after the intermediate heat treatment until the surface temperature becomes a temperature of not less than 80° C. and not more than 120° C.;

(e) a transverse drawing step of drawing the film after forced cooling at a draw ratio of not less than 2.0 times and not more than 6.0 times in the width direction at a temperature of not less than (Tg+10° C.) and not more than (Tg+50° C.); and (f) a final heat treatment step of heat-treating the film after transverse drawing for a time period of not less than 1.0 seconds and not more than 9.0 seconds at a temperature of the transverse drawing temperature+not less than 15° C. and not more than 40° C. with both edges in the width direction being held by clips in a tenter.

8. A package, wherein the heat-shrinkable polyester film of any of the first to fifth is used as a base material and a label provided with perforations or a pair of notches is attached on at least a part of the outer circumference and heat-shrunk.

Effects of the Invention

The heat-shrinkable polyester film of the present invention has a reduced change in physical properties of the film after long-time aging under an environment intended to represent the summer season, and does not require storage at a low temperature. Further, the shrinkage rate in the width direction being the main shrinkage direction is high, and the mechanical strength in the longitudinal direction orthogonal to the width direction is also high, so that the stiffness (so-called "bend" strength) is high, and the attachability as a label is excellent. In addition, processabilities in printing and tubing are excellent. Therefore, the heat-shrinkable polyester film of the present invention can be suitably used as labels for containers such as bottles, and when used as labels, it can be attached very aesthetically and efficiently on containers such as bottles within a short time.

BEST MODE FOR CARRYING OUT THE INVENTION

The polyester used in the present invention is a polyester whose main constituent is ethylene terephthalate unit. Namely, it contains 50% by mole or more, preferably 60% by mole or more of ethylene terephthalate unit. Dicarboxylic acid components constituente the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid. It contains preferably 93% by mole or less of ethylene terephthalate unit.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is low in film stiffness at high-speed attachment and therefore, it is not preferable.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a desired shrinkage rate.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat-shrinkable polyester film of the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C. The particularly preferable diol is 1,3-propanediole or 1,4-butanediol, which may be mixed in a polyester resin in the form of a polytrimethylene terephthalate polymer or polybutylene terephthalate polymer.

Further, the polyester used for the heat-shrinkable polyester film of the present invention preferably has 7% by mole or more and 27% by mole or less of the sum of at least one monomer capable of forming an amorphous component in 100% by mole of the polyhydric alcohol component or in 100% by mole of the polybasic carboxylic acid component in the whole polyester resin, more preferably 9% by mole or more and 25% by mole or less.

Here, as a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a desired shrinkage rate and therefore, it is not preferable.

Further, in the polyester used in the heat-shrinkable polyester film of the present invention, it is preferable not to contain diethylene glycol, triethylene glycol and polyethylene glycol as far as possible. Particularly, diethylene glycol is a by-product component at polyester polymerization and therefore easy to exist, but in the polyester for use in the present invention, the content of diethylene glycol is preferably less than 4 mol %.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat-shrinkable polyester film of the present invention, it is preferable to make workability (slipperiness) of the polyethyleneterephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

Furthermore, it is also possible to conduct corona treatment, coating treatment, frame treatment etc. on the heat-shrinkable polyester film of the present invention in order to enhance adhesiveness of film surface.

The heat shrinkage rate is calculated by the following formula 1 from lengths before and after shrinkage when the heat-shrinkable polyester film of the present invention is treated for 10 seconds under no-load conditions in glycerin heated to any temperature. The heat shrinkage rate in the film width direction at 80° C. is preferably not more than 10%.

$$\text{Heat shrinkage rate} = \{(\text{length before shrinkage} - \text{length after shrinkage})/\text{length before shrinkage}\} \times 100 (\%) \quad \text{Equation 1}$$

A high decrease in heat shrinkage rate as measured before and after aging means a strong influence of aging, which is not preferable. That is, provided that the aging temperature is 60° C., if the glycerin heat shrinkage rate at 80° C., i.e. aging temperature+20° C., is more than 10%, the glycerin heat shrinkage rate at 80° C. after aging decreases, and the difference in shrinkage rate before and after aging increases, which is not preferable. Therefore, the upper limit of the glycerin heat shrinkage rate at 80° C. in the film width direction is preferably not more than 10%, more preferably not more than 8%, and further preferably not more than 7%. When the glycerin heat shrinkage rate at 80° C. in the film width direction is not more than −3%, the film is once elongated during shrinkage, and therefore shrinkage finish properties are deteriorated, which is not preferable. Thus, the lower limit of the glycerin heat shrinkage rate at 80° C. in the film width direction is preferably not less than −2%, more preferably not less than −1%, further preferably not less than 0%.

Further, the heat shrinkage rate of the film in the longitudinal direction calculated by the above formula 1 from lengths before and after shrinkage when the heat-shrinkable polyester film of the present invention is treated for 10 seconds under no-load conditions in glycerin heated to 100° C. (namely, heat shrinkage rate in glycerin at 100° C.) is preferably not less than 0% and not more than 10%, more preferably not less than 1% and not more than 8%, and particularly preferably not less than 2% and not more than 6%.

When the glycerin heat shrinkage rate at 100° C. in the longitudinal direction is less than 0% (namely, the shrinkage rate is a negative value), satisfactory shrinkage appearance is difficult to obtain when the film is used as a label for a bottle, thus being not preferable. Conversely, if the heat shrinkage rate at 100° C. in the longitudinal direction is more than 10%, strains easily occur in shrinkage at heat shrinkage when the film is used as a label, thus being not preferable. The lower limit of the heat shrinkage rate at 100° C. in the longitudinal direction is more preferably not less than 1%, and particularly preferably not less than 3%. The upper limit of the heat shrinkage rate at 100° C. in the longitudinal direction is more preferably not more than 8%, and particularly preferably not more than 6%.

Further, the heat shrinkage rate of the film in the width direction calculated by the above formula 1 from lengths before and after shrinkage when the heat-shrinkable polyester film of the present invention is treated for 10 seconds under no-load conditions in glycerin heated to 100° C. (namely, heat shrinkage rate in glycerin at 100° C.) is preferably not less than 20%, more preferably not less than 22%, and particularly preferably not less than 24%.

If the glycerin heat shrinkage rate at 100° C. in the width direction is less than 0% (namely, the shrinkage rate is a negative value), since the amount of shrinkage is small, it is not preferable because wrinkle and sag generate on a label after heat shrinkage. In contrast, the glycerin heat shrinkage rate at 100° C. in the width direction is preferably to a certain extent, but if the heat shrinkage rate at 80° C. is controlled to 10% or less, the upper limit of the heat shrinkage rate at 100° C. is 40%.

Further, the heat shrinkage rate of the film in the width direction calculated by the above formula 1 from lengths before and after shrinkage when the heat-shrinkable polyester film of the present invention is treated for 10 seconds under no-load conditions in glycerin heated to 120° C. (namely, heat shrinkage rate in glycerin at 120° C.) is preferably not less than 40% and not more than 70%, more preferably not less than 42% and not more than 68%, and particularly preferably not less than 44% and not more than 66%.

If the glycerin heat shrinkage rate at 120° C. in the width direction is less than 40%, since the amount of shrinkage is small, it is not preferable because wrinkle and sag generate on a label after heat shrinkage. Conversely, if the heat shrinkage rate at 120° C. in the longitudinal direction is more than 70%, strain in shrinkage at heat shrinkage tends to occur when used as a label, or so-called "jumping up" may be generated, and therefore the case is not preferred.

In the heat-shrinkable polyester film of the present invention, when tensile breaking strength in the longitudinal direction is obtained by the following method, the tensile breaking strength needs to be 80 MPa or more and 300 MPa or less.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

When the tensile breaking strength in the longitudinal direction is less than 80 MPa, it is not preferable because stiffness becomes weak when attached on a bottle etc. as a label. The lower limit value of the tensile breaking strength is preferably 90 MPa or more, and particularly preferably 100 MPa or more. The higher the upper limit of the tensile breaking strength, the more preferable because the bend strength increases, but it is believed that the upper limit of the tensile breaking strength is not more than 300 MPa from the viewpoint of raw materials and a production process.

Further, in the heat-shrinkable polyester film of the present invention, the shrinkage rate in the film width direction after aging for 672 hours at a temperature of 60° C. and a relative humidity of 40% (so-called natural shrinkage rate) is preferably not more than 1.5% when determined by the following method.

[Method for Measurement of Natural Shrinkage Rate]

A film is sampled in a length of 20 mm in the film longitudinal direction and 240 mm in the film width direction, and marked with lines such that the length in the film width direction is 200 mm. The length between the lines is designated as a length (mm) before aging. The film is aged for 672 hours in a gear oven set at a temperature of 60° C. and a relative humidity of 40%, followed by determining the natural shrinkage rate from the following formula 2 with the length between the lines designated as a length (mm) after aging.

Natural shrinkage rate={(length before aging−length after aging)/length before aging}×100%  formula 2

If the natural shrinkage rate in the width direction is more than 1.5%, the film product width after storage is different from that just after production, and the dimension varies in a processing step such as printing, thus being not preferable. The upper limit of the natural shrinkage rate is more preferably not more than 1.3%, and particularly preferably not more than 1.1%. The lower limit of the natural shrinkage rate is preferably 0%, but is believed to be not less than 0.4% from the viewpoint of the raw materials and production process.

In the heat-shrinkable polyester film of the present invention, the number of initial breakages in the film longitudinal direction is preferably not more than 2 times per 10 times after aging for 672 hours at a temperature of 60° C. and a relative humidity of 40%.

[Method for Measurement of the Number of Initial Breakages]

A film after aging is sampled in a rectangle of 140 mm in the longitudinal direction and 20 mm in the width direction. The film is held at both ends of the test piece in the longitudinal direction using a universal tensile tester (the chuck grip position of one side: 20 mm; the distance between chucks: 100 mm), and a tensile test is carried out under conditions of a temperature of 23° C. and a tensile speed of 200 mm/min. The tensile test is repeated with 10 samples, and the number of samples are broken at not more than 5% elongation in the longitudinal direction of the film is obtained, and designated as the number of initial breakages.

If the number of initial breakages in the film longitudinal direction after aging is more than 2 times, the probability increases that the film is broken to cause process abnormality when brought under a tension by winding out a film roll for printing after aging, thus being not preferable. The lower limit of the number of initial breakages in the longitudinal direction is further preferably not more than 1 time, and most preferably 0.

For the glycerin shrinkage rate in the film width direction when the heat-shrinkable polyester film of the present invention is treated for 10 seconds in glycerin at each of temperatures of 80° C., 100° C. and 120° C., which is determined by the above formula 1, a difference in shrinkage rate of the film before aging and after aging for 672 hours at a temperature of 60° C. and a relative humidity of 40% is preferably not more than 10% when determined by the following method.

[Method for Measurement of Difference in Heat Shrinkage Rates Before and After Aging]

From the above formula 1, the heat shrinkage rates of the film in the film width direction in glycerin at each predetermined temperature are measured before and after aging. The difference is determined by the following formula 3.

Difference in heat shrinkage rate before and after aging=Heat shrinkage rate before aging−Heat shrinkage rate after aging  formula 3

If the difference in heat shrinkage rate in the width direction before and after aging is more than 10%, a difference between the heat shrinkage rate of the film just after production and that after storage is so large that temperature conditions for heat-shrinking the film when formed into a label or the like vary and shrinkage finish properties are deteriorated, thus being not preferable. The upper limit of the difference in the heat shrinkage rate in the width direction before and after aging is more preferably not more than 8%, and particularly preferably not more than 6%. The lower limit of the difference in heat shrinkage rate in the width direction before and after aging is preferably 0%, but is believed to be not less than 2% from the viewpoint of the raw materials and production process.

The thickness of the heat-shrinkable polyester film of the present invention is not particularly limited, but 5 to 200 μm is preferable as a heat-shrinkable film for a label, and 10 to 70 μm is more preferable.

The production process of the heat heat-shrinkable polyester film of the present invention is not particularly limited, and is described by examples. The heat heat-shrinkable polyester film of the present invention can be obtained from a polyester raw material that has ethylene terephthalate as main constituent and has 7% by mole or more of the sum of at least one monomer capable of forming an amorphous component in the whole polyester resin, and the polyester raw material is melt-extruded by an extruder to form an undrawn film, and the undrawn film is biaxially drawn by a predetermined process shown below and heat-treated.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after longitudinally drawing is quenched, and then heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming process to obtain a heat-shrinkable polyester film of the present invention is described in detail by considering the difference from the film forming process of the conventional heat-shrinkable polyester film.

As described above, a conventional heat-shrinkable polyester film can be produced by drawing an undrawn film only in a direction to be shrunk (namely, main shrinkage direction, ordinarily width direction). The present inventors have studied on the conventional production process, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a process of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a process of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Further, based on the problems in production of the conventional heat-shrinkable polyester film, the present inventors have further conducted studies for obtaining a heat-shrinkable polyester film having satisfactory physical properties after aging at a temperature of 60° C. and a relative humidity of 40% and high productivity and as a result, arrived at the following findings.

It is considered that for reducing a decrease in heat shrinkage rate of a film after aging, the heat shrinkage rate until an aging temperature of up to +20° C. should be not more than 10%, so that a change in shrinkage rate before and after aging is reduced.

It is considered that in order for initial breakages after aging to be satisfactory, molecules oriented in the longitudinal direction should be retained to a certain extent.

It is considered that in order for finishing after shrinkage-attachment as a label to be satisfactory, it is essential not to exhibit a shrinkage force in the longitudinal direction, and for this purpose, the tensed state of molecules oriented in the longitudinal direction should be canceled out.

From the findings, the present inventors have given attention to two points for satisfying good physical properties of a film after aging and shrinkage finish properties at the same time. It has been considered that for one point, "molecules not contributed to shrinkage force while being oriented in the longitudinal direction" should be made to exist in a film and for the other point, the heat shrinkage rate at 80° C. should be not more than 10% because an aging temperature+20° C. leads to a high decrease in shrinkage rate after aging. The inventors have made a trial and error with attention given to how to carry out drawing so that "molecules not contributed to shrinkage force while being oriented in the longitudinal direction" can be made to exist in a film. As a result, by employing the following means when producing a film by so called a lengthwise-transverse drawing process of drawing a film in the longitudinal direction, followed by drawing the film in the width direction, "molecules not contributed to shrinkage force while being oriented in the longitudinal direction" have been successfully made to exist in a film, thus making it possible to obtain a heat-shrinkable polyester film satisfying a good mechanical strength in the longitudinal direction and shrinkage finish properties at the same time. Further, the heat shrinkage rate at 80° C. has been reduced to devise the present invention.

(1) Control of lengthwise drawing conditions
(2) Annealing in the longitudinal direction after lengthwise drawing
(3) Intermediate heat treatment after lengthwise drawing
(4) Forced cooling of film after intermediate heat treatment
(5) Control of transverse drawing conditions
(6) Final heat treatment after transverse drawing Hereinafter, the means described above are explained in order.

(1) Control of Lengthwise Drawing Conditions

In the production of a film by the lengthwise-transverse drawing process of the present invention, it is preferable to carry out lengthwise drawing in two stages for obtaining a film roll of the present invention. That is, a substantially unoriented (non-drawn) film is preferably lengthwise drawn so as to provide a total lengthwise draw ratio (i.e. first-stage lengthwise draw ratio×second-stage draw ratio) of not less than 2.8 times and not more than 4.5 times by first lengthwise drawing the film so as to provide a draw ratio of not less than 2.2 times and not more than 3.0 times at a temperature of not less than Tg and not more than (Tg+30° C.) (first-stage drawing) and then lengthwise drawing the film so as to provide a draw ratio of not less than 1.2 times and not more than 1.5 times at a temperature of not less than (Tg+10) and not more than (Tg+40° C.) without cooling to a temperature of not more than Tg (second-stage drawing). It is more preferable to lengthwise draw the film so that the total lengthwise draw ratio is not less than 3.0 times and not more than 4.3 times.

When carrying out lengthwise drawing in two stages as described above, it is preferable to adjust conditions for lengthwise drawing so that a refractive index of a film in the longitudinal direction after lengthwise drawing is in a range of 1.600 to 1.630 and the heat shrinkage stress of the film in the longitudinal direction after lengthwise drawing is not more than 10 MPa. By carrying out the lengthwise drawing in such predetermined conditions, it become possible to control the degree of orientation of a film in the longitudinal direction and width direction and the degree of tension of molecules in the following intermediate heat treatment, transverse drawing and final heat treatment, and consequently the perforation opening property of a final film can be made satisfactory.

When the total lengthwise draw ratio increases when carrying out drawing in the lengthwise direction as described above, the shrinkage rate in the longitudinal direction tends to increase, but by carrying out drawing in the lengthwise direction in two stages as described above, the drawing stress in the longitudinal direction can be reduced and the shrinkage rate in the longitudinal direction can be kept low. When the total lengthwise draw ratio increases, the stress during drawing in the width direction increases, so that it tends to be difficult to control the final shrinkage rate in the transverse direction, but by carrying out drawing in two stages, the drawing stress in the transverse direction can also be reduced, and it becomes easy to control the shrinkage ratio in the transverse direction.

When the total lengthwise draw ratio increases, the tensile breaking strength in the film longitudinal direction increases. Further, by carrying out drawing in the lengthwise direction in two stages, the production speed increases to improve productivity.

Further, by carrying out drawing in the lengthwise direction in two stages, the drawing stress in the longitudinal direction decreases, so that the irregularity of thickness in the longitudinal direction and the irregularity of thickness in the width direction tend to increase, but by increasing the total lengthwise draw ratio, the irregularity of thickness in the longuitudinal direction can be decreased, and accordingly the haze can be reduced. In addition, by increasing the total lengthwise draw ratio, the stress during transverse drawing increases, so that the irregularity of thickness in the width direction can also be reduced.

(2) Annealing in the Longitudinal Direction after Lengthwise Drawing

As described above, in order for "molecules not contributed to shrinkage force while being oriented in the longitudinal direction" to exist in a film, it is preferable to thermally relax molecules oriented in the longitudinal direction. When the residual shrinkage stress of the film in the longitudinal direction after lengthwise drawing is high, there is the disadvantage that the hot-water shrinkage rate in the film longitudinal direction after transverse drawing increases to deteriorate shrinkage finish properties. It is effective to carry out a heat treatment in a transverse drawing step for decreasing the hot-water shrinkage rate in the film longitudinal direction, but thermal relaxation alone cannot sufficiently reduce the hot-water shrinkage rate in the film longitudinal direction, and a large amount of heat is required. Thus, the inventors have made studies on means for reducing the residual shrinkage stress of the film in the longitudinal direction after lengthwise drawing as much as possible before the transverse drawing step. It has been found that by carrying out relaxation in the longitudinal direction using a difference in speed between rolls while overheating a film after lengthwise drawing with an infrared heater, a decrease in residual shrinkage stress becomes higher than a decrease in orientation in the longitudinal direction, and the residual shrinkage stress decreases by half or more.

When the film is only heated with an infrared heater, and relaxation is not used, orientation does not decrease, but a decrease in shrinkage stress in the longitudinal direction is not sufficient. When only relaxation is carried out and the film is not heated with an infrared heater, there is a disadvantage that the film cannot sufficiently be relaxed between rolls, and sags to wind around the roll. The relaxation rate is preferably not less than 10% and not more than 50% in the longitudinal direction. When the relaxation rate is less than 10%, it is difficult to reduce by half the shrinkage stress of the film in the longitudinal direction after lengthwise drawing. The relaxation rate is further preferably not less than 15%. When the relaxation rate is more than 50%, the shrinkage stress of the film after lengthwise drawing is very low, but it is difficult to obtain a film having a decreased orientation in the longitudinal direction and a sufficient mechanical strength in the longitudinal direction. The relaxation rate is further preferably not more than 45%.

In overheating with an infrared heater during annealing, the temperature of the film is preferably not less than (Tg+10° C.) and not more than (Tg+40° C.). When the temperature of the film is less than (Tg+10° C.), heating cannot be sufficient, and the film sags during relaxation, winds around a roll, and wrinkles generate. When the film is heated to a temperature more than (Tg+40° C.), crystallization of the film proceeds, and transverse drawing in the following step becomes difficult. Film heating means in the annealing step is not limited to an infrared heater, and may be other heating means such as a hot air dryer, but the infrared heater is suitable for space-saving of equipment.

(3) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing process, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat setting, transverse drawing is conducted in a predetermined condition, thereby without causing breakage in the transverse drawing, to be able to make "molecules not contributed to shrinkage force while being oriented in the longitudinal direction" present in the film.

Namely, in the production of the film of the present invention by a lengthwise-transverse drawing process, after an undrawn film is lengthwisely drawn, under a state that both edges in the width direction are held by clips in a tenter, it is preferably to conduct heat treatment (hereinafter called intermediate heat treatment) at a temperature of 130° C. or more and 190° C. or less for 1.0 second or more and 9.0 seconds or less. By conducting such intermediate heat treatment, it becomes possible that "molecules not contributed to shrinkage force while being oriented in the longitudinal direction" can be present in a film, from which it becomes possible to obtain a film in which perforation opening property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following forced cooling and transverse drawing, it becomes possible to orient molecules to the width direction and exhibit shrinkage force in the width direction while maintaining "molecules not contributed to shrinkage force while being oriented in the longitudinal direction."

The lower limit of the temperature for the intermediate heat treatment is more preferably not less than 140° C., and further preferably not less than 150° C. The upper limit of the temperature for the intermediate heat treatment is more preferably not more than 180° C., and further preferably not more than 170° C. On the other hand, the time for the intermediate heat treatment is preferably appropriately adjusted within a range of not less than 1.0 second and not more than 9.0 seconds according to the raw material composition, and more preferably within a range of not less than 3.0 seconds and not more than 7.0 seconds.

By keeping the treatment temperature at a temperature of not less than 130° C. when carrying out the intermediate heat treatment as described above, the stress of shrinkage in the longitudinal direction can be reduced, and the shrinkage rate in the longitudinal direction can be made extremely low. By controlling the temperature for the intermediate heat treatment to a temperature of not more than 190° C., a variation in shrinkage rate in the transverse direction can be reduced.

By keeping the treatment temperature at a temperature of not less than 130° C., the orientation in the longitudinal direction can be increased, and the tensile breaking strength in the longitudinal direction can be kept high. By controlling the temperature for the intermediate heat treatment to a temperature of not more than 190° C., crystallization of the film can be suppressed to keep high the tensile breaking strength in the longitudinal direction.

Further, by controlling the temperature for the intermediate heat treatment to a temperature of not more than 190° C., the irregularity of thickness in the longitudinal direction can be kept low. In addition, by controlling the temperature for the intermediate heat treatment to a temperature of not more than 190° C., crystallization of the film can be suppressed to keep low the irregularity of thickness in the width direction resulting from a variation in stress during transverse drawing.

By controlling the temperature for the intermediate heat treatment to a temperature of not more than 190° C., breakage of the film resulting from occurrence of the irregularity of shrinkage of the film can be suppressed to retain a satisfactory slit property. In addition, by controlling the temperature for the intermediate heat treatment to a temperature of not more than 190° C., the haze of the film increased as due to crystallization of the film can be kept low.

Lengthwise drawing is carried out as described above, and "molecules not contributed to shrinkage force while being oriented in the longitudinal direction" are made to exist in the film after the intermediate heat treatment to increase the molecular orientation degree of the film. As a result, a decrease in molecular orientation of the film after aging becomes low and a change in physical properties after aging decreases.

(4) Forced Cooling of Film after Intermediate Heat Treatment

In production of a film by the lengthwise-transverse drawing process of the present invention, it is preferable to actively forcedly cool the film subjected to the intermediate heat treatment, so that the temperature of the film is not less than 80° C. and not more than 120° C., rather than transversely drawing the film as it is as described above. By carrying out such a forced cooling treatment, the heat shrinkage rate in the transverse direction and the irregularity of thickness can be made satisfactory. The lower limit of the temperature of the film after forced cooling is more preferably not less than 85° C., and further preferably not less than 90° C. The upper limit of the temperature of the film after forced cooling is more preferably not more than 115° C., and further preferably not more than 110° C.

As described above, in forced cooling a film, when the temperature of the film after forced cooling keeps exceeding 120° C., shrinkage ratio in the width direction of the film becomes low and shrinkage becomes insufficient as a label, but by controlling the temperature of the film after forced cooling at 120° C. or less, it becomes possible to maintain shrinkage ratio in the width direction of the film high.

Further, in forced cooling a film, when the temperature of the film after keeps continues exceeding 120° C., stress of transverse drawing carried out after cooling becomes small, and the irregularity of thickness in the width direction tends to become large, but by forced cooling a temperature of the film after cooling to be 120° C. or less, it becomes possible to increase the stress of transverse drawing carried out after cooling and to reduce the irregularity of thickness in the width direction.

Further, if the temperature of the film after forced cooling is less than 80° C. when forcedly cooling the film, the stress of transverse drawing carried out after cooling increases, and the irregularity of thickness in the width direction decreases, but breakage easily occurs because of the high traverse drawing stress to increase the possibility of deteriorating productivity, which is not preferable.

(5) Control of Transverse Drawing Conditions

In production of a film by the lengthwise-transverse drawing process of the present invention, it is preferable to transversely draw the film after lengthwise drawing, annealing, the intermediate heat treatment, natural cooling and forced cooling under predetermined conditions and carry out a final heat treatment. That is, transverse drawing is preferably carried out so as to provide a draw ratio of not less than 2.0 times and not more than 6.0 times at a temperature of not less than (Tg+10° C.) and not more than (Tg+50° C.), for example a temperature of not less than 80° C. and not more than 120° C., with both edges in the width direction being held by clips in a tenter. By conducting the transverse drawing in such a predetermined condition, it becomes possible to orient molecules to the width direction, exhibit shrinkage force in the width direction, and increase tensile breaking strength of the film longitudinal direction, while maintaining "molecules not contributed to shrinkage force while being oriented in the longitudinal direction" formed by lengthwise drawing and intermediate heat treatment. The lower limit of the temperature of transverse drawing is preferably 85° C. or more, and more preferably 90° C. or more. The upper limit of the temperature of transverse drawing is preferably 115° C. or less, and more preferably 110° C. or less. On the other hand, the lower limit of transverse drawing ratio is preferably 2.5 times or more, and more preferably 3.0 times or more. Further, the upper limit of transverse drawing ratio is preferably 5.5 times or less, and more preferably 5.0 times or less.

If the drawing temperature is high when drawing the film in the transverse direction as described above, the tensile strength in the longitudinal direction satisfactorily increases.

When the drawing temperature is more than 120° C., the shrinkage rate in the film width direction decreases, but by controlling the drawing temperature to a temperature of not more than 120° C., the shrinkage rate in the width direction can be retained.

Further, when the drawing temperature is more than 120° C., there is a tendency that the irregularity of thickness in the width direction becomes large, but by controlling the drawing temperature at 120° C. or less, it becomes possible to reduce the irregularity of thickness in the width direction.

On the other hand, when the drawing temperature is less than 80° C., orientation in the width direction becomes so high that breakage easily occurs during transverse drawing, but by controlling the drawing temperature to a temperature of not less than 80° C., breakage during transverse drawing is reduced.

(6) Final Heat Treatment after Transverse Drawing

The film after transverse drawing is preferably finally heat-treated at a temperature of a transverse drawing+not less than 15° C. and not more than 45° C., for example a temperature of not less than 100° C. and not more than 160° C., for a time period of not less than 5 seconds and not more than 10 seconds both edges in the width direction being held by clips in a tenter. When the temperature is more than 160° C., the shrinkage rate in the width direction decreases, and the heat shrinkage rate at 100° C. becomes less than 20%, which is not preferable. When the temperature is less than 100° C., the film cannot sufficiently be relaxed in the width direction, the heat shrinkage rate at 80° C. becomes higher than 10%, and shrinkage in the width direction (so-called natural shrinkage rate) increases over time when a final product is stored under normal temperature, which is not preferable. The longer the heat treatment time, the more preferable, but if the heat treatment time is too long, an equipment becomes extremely large, and therefore the heat treatment time is preferably not more than 10 seconds.

The natural shrinkage rate after aging can also be decreased by carrying out relaxation in the film width direction in the final heat treatment step after transverse drawing. However, oriented molecular chains are relaxed by the relaxation. Therefore, for retaining a decrease in shrinkage rate after aging and the strength, it is preferable to carry out a heat treatment in a fixed length because oriented molecular chains increase, but in the present invention, a film in a desired range can be obtained even by carrying out relaxation.

One surface or both surfaces of a film can also be subjected to a corona treatment during, before or after the drawing to improve adhesiveness to a print layer and/or an adhesive layer, etc. of the film.

One surface or both surfaces of a film can also be coated during, before or after the drawing step to improve the adhesiveness, releasability, antistatic property, slipperiness, light blocking property and the like of the film.

The package of the present invention is a package using the foregoing heat-shrinkable polyester film as a base material, and as an object of the package, to start with PET bottles for beverage, various kinds of bottles and cans, plastic containers for confectionary or lunch bag etc., paper box and the like can be listed (hereinafter, these are collectively referred to as a packaging object). In general, in the case where a label using a heat-shrinkable polyester film as a base material is attached on the packaging object and heat-shrunk, the label is heat-shrunk by about 2 to 15% and closely attached on the package. Additionally, a label attached on a packaging object may be printed or may not be printed.

A packaging object is discarded in the state that tore off a label from the packaging object due to environmental responses in recent years. Thus, a label may be provided with perforations or notches beforehand for easily detaching the label, heat-shrunk by about 2 to 15% and brought into close contact with a package.

A process for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

The present invention will be described further specifically below with reference to Examples, but the present invention is not limited to these Examples as long as its spirit is not exceeded.

Evaluation methods using in the present invention are as follows.

[Heat Shrinkage Rate (Glycerin Heat Shrinkage Rate)]

A film was cut into a square of 10 cm×10 cm, and treated for 10 seconds under no load conditions in glycerin heated to a predetermined temperature±0.5° C., and then the dimensions of the film in the lengthwise and transverse directions were measured, and heat shrinkage rate each was obtained according to the following Equation 1. An average value of heat shrinkage rates from two measurements was calculated.

$$\text{Heat shrinkage rate} = \{(\text{length before shrinkage} - \text{length after shrinkage})/\text{length before shrinkage}\} \times 100(\%) \qquad \text{Equation 1}$$

[Heat Shrinkage Rate After Aging (Glycerin Heat Shrinkage Rate)]

A film sample cut in a length of 20 cm in the longitudinal direction and 30 cm in the width direction was aged for 672 hours in a gear oven set at a temperature of 60° C. and a relative humidity of 40%. Thereafter, two square pieces of 10 cm×10 cm were cut out from the aged film, and caused to be heat-shrunk by carrying out a heat treatment for 10 seconds under non-load conditions in glycerin heated to a predetermined temperature±0.5° C., dimensions of the films in the lengthwise and transverse directions were then measured, and heat shrinkage rates were each determined in accordance with the above formula 1. An average value of heat shrinkage rates from two measurements was calculated for each heat shrinkage treatment temperature.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

[Method for Measurement of Natural Shrinkage Rate]

A film is sampled in a length of 20 mm in the film longitudinal direction and 240 mm in the film width direction, and marked with lines such that the length in the film width direction is 200 mm. The length between the lines was designated as a length (mm) before aging. The film was aged for 672 hours in a gear oven set at a temperature of 60° C. and a relative humidity of 40%, followed by determining the natural shrinkage rate from the following formula 2 with the length between the lines designated as a length (mm) after aging. An average value of natural shrinkage rates from two measurements was calculated.

Natural shrinkage rate={(length before aging−length after aging)/length before aging}×100%     formula 2

[Method for Measurement of Difference in Heat Shrinkage Rates Before and After Aging]

From the above formula 1, the heat shrinkage rates of the film in the film width direction in glycerin at each predetermined temperature were measured before and after aging. The difference was determined by the following formula 3.

Difference in heat shrinkage rates before and after aging=Heat shrinkage rate before aging−Heat shrinkage rate after aging     formula 3

[Method for Measurement of the Number of Initial Breakages]

A film after aging was sampled in a rectangle of 140 mm in the longitudinal direction and 20 mm in the width direction. The film was held at both edges of the test piece in the longitudinal direction using a universal tensile tester (the chuck grip position of one side: 20 mm; the distance between chucks: 100 mm), and a tensile test was carried out under conditions of a temperature of 23° C. and a tensile speed of 200 mm/min. 10 samples were cut out from one piece aged film, the tensile test was repeated, and the number of samples were broken at not more than 5% elongation in the longitudinal direction of the film was obtained, and designated as the number of initial breakages.

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind the inflection point of the endothermic curve, and the intersection was defined as Tg (glass transition point).

[Shrinkage Finish Property]

On a heat-shrinkable film after aging, a three color-printing with green, gold and white ink of Toyo Ink Mfg Co., Ltd. was provided previously. By bonding both end parts of the printed film with dioxolan, a cylindrical-form label (label in which main shrinkage direction of the heat-shrinkable film was the circumferential direction) was produced. Thereafter, using a shrink tunnel (hot air) model:K-2000 manufactured by Kyowa Denki Co., Ltd., the label was attached by heat shrinkage on a PET bottle of 500 ml (trunk diameter 62 mm, minimum diameter of neck part 25 mm) at a zone temperature of 150° C. with a passing time of 10 seconds. In attachment, the neck part was adjusted such that the part of diameter 50 mm was placed on one edge of the label. Finish properties after shrinkage were visually evaluated, and the criteria were as follows.

Excellent: No wrinkles, jumping up and shrinkage shortage occur and no colored spots are seen as well Good: No wrinkles, jumping up and shrinkage shortage can be ascertained, but some colored spots are seen Fair: Wrinkles occur, and no jumping up and shrinkage shortage occur Poor: Wrinkles, jumping up and shrinkage shortage occur

[Label Adhesiveness]

A label was attached onto a PET bottle under the same conditions as the conditions of the shrinkage finish property as described above. Then, when the attached label and the PET bottle were lightly twisted, the label was evaluated as good if the label was not moved, and if the label came off or the label and the bottle shifted, the label was evaluated as poor.

Properties and compositions of polyester resins used in Examples and Comparative Examples, and production conditions of films in Examples and Comparative Examples ware shown in Table 1 and 2 respectively.

<Preparation of Polyester Raw Material>

100 mol % of dimethyl terephthalate (DMT) as a dibasic acid component and 100 mol % of ethylene glycol (EG) as a glycol component were placed in a stainless steel autoclave equipped with a stirrer, a thermometer and a partially circulating cooler such that the amount of glycol was 2.2 times the amount of methyl ester in terms of the molar ratio, and an ester exchange reaction was carried out using 0.05 mol % (based on the acid component) of zinc acetate as an ester exchange catalyst while distilling away generated methanol to outside the system. Thereafter, 0.025 mol % (based on the acid component) of antimony trioxide was added as a polycondensation catalyst, and a polycondensation reaction was carried at 280° C. under a reduced pressure of 26.6 (0.2 torr) to obtain polyester (A) having an intrinsic viscosity of 0.70 dl/g. This polyester is polyethylene terephthalate. In production of the polyester (A), $SiO_2$ (Silysia 266 manufactured by FUJI SILYSIA CHEMICAL LTD.) was added as a lubricant in a ratio of 8000 ppm based on polyester. Polyesters (B, C and E) shown in Table 1 were synthesized by the same process as described above. In the table, NPG is neopentyl glycol, BD is 1,4-butanediol and CHDM is 1,4-cyclohexanedimethanol. The intrinsic viscosities of polyesters A, B, C, D and E were 0.72 dl/g, 0.72 dl/g, 0.72 dl/g, 1.15 dl/g and 0.72 dl/g, respectively. Each polyester was appropriately formed into a chip.

TABLE 1

| | Raw material composition of polyester (mol %) | | | | | |
|---|---|---|---|---|---|---|
| | Dicarboxylic acid component | Polyhydric alcohol component | | | | Added mount of lubricant |
| | DMT | EG | NPG | BD | CHDM | (ppm) |
| Polyester A | 100 | 100 | — | — | — | 8000 |
| Polyester B | 100 | 100 | — | — | — | 0 |
| Polyester C | 100 | 70 | 30 | — | — | 0 |
| Polyester D | 100 | — | — | 100 | — | 0 |
| Polyester E | 100 | 70 | — | — | 30 | 0 |

Example 1

Polyester A, polyester B and Polyester C as described above were mixed in the weight ratio of 5:20:75 and the mixed resin was introduced into an extruder. Thereafter, the mixed resin was molten at 280° C. and extruded from a T-die and then quenched by winding it around a rotating metal roll set at a surface temperature of 30° C. An undrawn film with a thickness of 305 µm was obtained. The take-off speed (rotational speed of the metal roll) of the undrawn film at this time was about 20 m/min. Tg of the undrawn film was 75° C.

The undrawn film thus obtained was introduced into a lengthwise drawing machine with a plurality of rolls placed sequentially, and drawn in the lengthwise direction in two stages using a difference in rotation speed between rolls. That is, the undrawn film was preheated on a preheating roll until the film temperature reached 78° C., and drawn at a draw ratio of 2.6 times using a difference in rotation speed between a low-speed rotating roll whose surface temperature was set at 78° C. and a middle-speed rotating roll whose surface temperature was set at 78° C. (first-stage lengthwise drawing). Further, the lengthwise drawn film was lengthwise drawn at a draw ratio of 1.4 times using a difference in rotation speed between a middle-speed rotating roll whose surface temperature was set at 95° C. and a high-speed rotating roll whose surface temperature was set at 30° C. (second-stage lengthwise drawing) (thus, the total lengthwise draw ratio was 3.64 times).

The film lengthwise just after being lengthwise drawn as described above was annealed by relaxing the film in the longitudinal direction by 30% using a difference in speed between rolls while overheating the film at a film temperature of 93° C. with an infrared heater.

The film after being annealed as described above was forcedly cooled at a cooling rate of 40° C./second by a cooling roll (high-speed rotating roll located just after the second-stage lengthwise drawing roll) whose surface temperature was set at 30° C., and the cooled film was then introduced into a tenter and made to pass sequentially through an intermediate heat treatment zone, a cooling zone (forced cooling zone), a transverse drawing zone and a final heat treatment zone.

The lengthwise drawn film introduced into the tenter was first heat-treated for 5.0 seconds at a temperature of 150° C. in the intermediate heat treatment zone, then introduced into the cooling zone, actively forcedly cooled by spraying cold air until the surface temperature of the film reached 100° C., and drawn at a draw ratio of 4.0 times in the width direction (transverse direction) at 95° C.

Thereafter, the transversely drawn film was introduced into the final heat treatment zone, heat-treated at a temperature of 125° C. for 5.0 seconds in the final heat treatment zone, then cooled, and wound in a roll shape in a width of 500 mm with both edges cut and removed, whereby a biaxially drawn film having a thickness of about 30 µm was continuously produced over a predetermined length. The properties of the film obtained were evaluated by the foregoing method. The evaluation results are shown in Table 3.

Desired properties were obtained, and satisfactory results of a small change in physical properties after aging were shown.

Example 2

A biaxially drawn film having a width of 500 mm and a thickness of about 30 µm was continuously produced by the same process as in Example 1 except that the thickness of a undrawn film was 262 µm and the relaxation rate was 40% in annealing in the longitudinal direction after lengthwise drawing. The properties of the film obtained were evaluated by the foregoing method. The evaluation results are shown in Table 3. The obtained film had a tensile breaking strength lower than that of Example 1, but desired properties were obtained, and satisfactory results of a small change in physical properties after aging were shown.

Example 3

Polyester A, polyester B, polyester C and polyester D were mixed in the weight ratio of 5:10:75:10 and introduced into an extruder. Thereafter, the mixed resin was melted at 280° C., extruded from a T die, wound around a rotating metal roll whose surface temperature was cooled to 30° C., and cooled rapidly, whereby a undrawn film having a thickness of 305 µm was obtained. The pickup speed of the undrawn film (rotation speed of metal roll) at this time was about 20 m/min. Tg of the undrawn film was 67° C. A biaxially drawn film having a width of 500 mm and a thickness of about 30 µm was continuously produced by the same process as in Example 1 except for the above-mentioned conditions. The properties of the film obtained were evaluated by the foregoing method. The evaluation results are shown in Table 3. The obtained film had larger difference in shrinkage rate before and after aging as compared to Example 1, but desired properties were obtained and satisfactory results of a small change in physical properties after aging were shown.

Example 4

Polyester A, polyester B and Polyester C as described above were mixed in the weight ratio of 5:65:30 and the mixed resin was introduced into an extruder. Thereafter, the mixed resin was molten at 280° C. and extruded from a T-die and then quenched by winding it around a rotating metal roll set at a surface temperature of 30° C. An undrawn film with a thickness of 311 µm was obtained. The Tg of the undrawn film was 75° C.

The undrawn film thus obtained was introduced into a lengthwise drawing machine with a plurality of rolls placed sequentially, and drawn in the lengthwise direction in two stages using a difference in rotation speed between rolls. That is, the undrawn film was preheated on a preheating roll until the film temperature reached 78° C., and drawn at a draw ratio of 2.4 times using a difference in rotation speed between a low-speed rotating roll whose surface temperature was set at 78° C. and a middle-speed rotating roll whose surface temperature was set at 78° C. (first-stage lengthwise drawing). Further, the lengthwise drawn film was lengthwise drawn at a draw ratio of 1.2 times using a difference in rotation speed between a middle-speed rotating roll whose surface temperature was set at 95° C. and a high-speed rotating roll whose surface temperature was set at 30° C. (second-stage lengthwise drawing) (thus, the total lengthwise draw ratio was 2.88 times).

The film lengthwise just after being lengthwise drawn as described above was annealed by relaxing the film in the longitudinal direction by 10% using a difference in speed between rolls while overheating the film at a film temperature of 93° C. with an infrared heater. A biaxially drawn film having a width of 500 mm and a thickness of about 30 µm was continuously produced by the same process as in Example 1 except that the temperature of final heat treatment after transverse drawing was set at 115. The properties of the film obtained were evaluated by the foregoing method. The evaluation results are shown in Table 3.

The obtained film had lower shrinkage rate in the transverse direction as compared to Example 1, and was poor in shrinkage finish property, but desired properties were obtained, and satisfactory results of a small change in physical properties after aging were shown.

Example 5

A biaxially drawn film having a width of 500 mm and a thickness of about 30 µm was continuously produced by the same process as in Example 1 except that the temperature of intermediate heat treatment was changed to 160° C. The properties of the film obtained were evaluated by the foregoing method. The evaluation results are shown in Table 3. The obtained film had a shrinkage rate in the longitudinal direction smaller than that of Example 1, difference in heat shrinkage rates before and after aging was smaller and satisfactory results were shown.

Example 6

A biaxially drawn film having a width of 500 mm and a thickness of about 30 μm was continuously produced by the same process as in Example 1 except that the polyester C of Example 1 was changed to the polyester E. Tg of the undrawn film was 74° C. The properties of the film obtained were evaluated by the foregoing method. The evaluation results are shown in Table 3. The obtained film had a shrinkage rate in the longitudinal direction smaller than that of Example 1, and satisfactory results of a small change in physical properties after aging were shown. The obtained film was comparable to Example 1, and satisfactory results were shown.

Example 7

A biaxially drawn film having a width of 500 mm and a thickness of about 30 μm was continuously produced by the same process as in Example 1 except that the temperature of final heat treatment was changed to 140° C. The properties of the film obtained were evaluated by the foregoing method. The evaluation results are shown in Table 3. The obtained film had a shrinkage rate in the longitudinal direction smaller than that of Example 1, difference in heat shrinkage rates and difference in natural shrinkage rates before and after aging were smaller and satisfactory results were shown.

Example 8

The weight of polyester B of Example 1 was reduced from 20% to 10%, and the weight of polyester C was changed from 75% to 85%. A biaxially drawn film having a width of 500 mm and a thickness of about 30 μm was continuously produced by the same process as in Example 1 except that the final heat treatment temperature was changed from 125° C. to 133° C. Tg of the undrawn film was 73° C. The properties of the film obtained were evaluated by the foregoing method. The evaluation results are shown in Table 3. The obtained film was comparable to Example 1, and satisfactory results were shown.

Comparative Example 1

A undrawn film having a thickness of 120 μm was obtained with a raw material same as that of Example 1. Without carrying out lengthwise drawing, annealing after lengthwise drawing and an intermediate heat treatment, the undrawn film was heated to 90° C., then drawn at a draw ratio of 4 times in the transverse direction at 80° C., and subjected to a final heat treatment at 110° C. for 5.0 seconds to continuously produce a monoaxially drawn film having a width of 500 mm and a thickness of about 30 μm. The properties of the film obtained were evaluated by the foregoing method. The evaluation results are shown in Table 3.

The obtained film had a higher decrease in shrinkage rate in the width direction after aging, a higher natural shrinkage rate, a larger number of breaks during an initial period and inferior shrinkage finish properties as compared to Example 1, and undesirable results were shown.

Comparative Example 2

A biaxially drawn film having a width of 500 mm and a thickness of about 30 μm was continuously produced by the same process as in Example 1 except that the temperature of final heat treatment after transverse drawing was changed to 90° C. The properties of the film obtained were evaluated by the foregoing method. The evaluation results are shown in Table 3. The obtained film had a higher difference in shrinkage rates before and after aging in the width direction, a higher natural shrinkage rate, and undesirable results were shown.

TABLE 2

| | Resin composition | Monomer content of Amorphous component (mol %) | Drawing conditions Lengthwise drawing | | |
|---|---|---|---|---|---|
| | | | Drawing temperature of first stage | Total draw ratio | Relaxation ratio in annealing step |
| Example. 1 | A/B/C = 5/20/75 | 22.5 | 78 | 3.64 | 30 |
| Example. 2 | A/B/C = 5/20/75 | 22.5 | 78 | 3.64 | 40 |
| Example. 3 | A/B/C/D = 5/10/75/10 | 22.5 | 78 | 3.64 | 30 |
| Example. 4 | A/B/C = 5/65/30 | 9 | 78 | 2.88 | 10 |
| Example. 5 | A/B/C = 5/20/75 | 22.5 | 78 | 3.64 | 30 |
| Example. 6 | A/B/E = 5/20/75 | 22.5 | 78 | 3.64 | 30 |
| Example. 7 | A/B/C = 5/20/75 | 22.5 | 78 | 3.64 | 30 |
| Example. 8 | A/B/C = 5/10/85 | 25.5 | 78 | 3.64 | 30 |
| Comparative Example 1 | A/B/C = 5/20/75 | 22.5 | | None | |
| Comparative Example 2 | A/B/C = 5/20/75 | 22.5 | 78 | 3.64 | 30 |

| | Intermediate heat treatment | | Drawing conditions Transverse drawing step | | | |
|---|---|---|---|---|---|---|
| | Temperature (° C.) | Time (sec) | Film surface temperature after cooling step (° C.) | Drawing temperature (° C.) | Draw ratio | Temperature of final heat treatment (° C.) |
| Example. 1 | 150 | 5 | 100 | 95 | 4 | 125 |
| Example. 2 | 150 | 5 | 100 | 95 | 4 | 125 |
| Example. 3 | 150 | 5 | 100 | 95 | 4 | 125 |
| Example. 4 | 150 | 5 | 100 | 95 | 4 | 115 |

TABLE 2-continued

| | | | | | | |
|---|---|---|---|---|---|---|
| Example. 5 | 160 | 5 | 100 | 95 | 4 | 125 |
| Example. 6 | 150 | 5 | 100 | 95 | 4 | 125 |
| Example. 7 | 150 | 5 | 100 | 95 | 4 | 140 |
| Example. 8 | 150 | 5 | 100 | 95 | 4 | 133 |
| Comparative Example 1 | | None | | 80 | 4 | 110 |
| Comparative Example 2 | 150 | 5 | 100 | 95 | 4 | 90 |

TABLE 3

| | Properties of heat-shrinkable film ||||||||||||
|---|---|---|---|---|---|---|---|---|---|---|---|---|
| | Heat shrinkage rate before aging (%) |||| Heat shrinkage rate after aging (%) |||| Difference in heat shrinkage rates before and after aging (%) ||||
| | Longitudinal direction | Width direction ||| Longitudinal direction | Width direction ||| Longitudinal direction | Width direction |||
| | 100° C. | 80° C. | 100° C. | 120° C. | 100° C. | 80° C. | 100° C. | 120° C. | 100° C. | 80° C. | 100° C. | 120° C. |
| Example. 1 | 4 | 2 | 24 | 53 | 3 | 1 | 22 | 51 | 1 | 1 | 2 | 2 |
| Example. 2 | 2 | 1 | 22 | 51 | 2 | 1 | 20 | 49 | 0 | 0 | 2 | 2 |
| Example. 3 | 5 | 8 | 35 | 63 | 4 | 2 | 29 | 58 | 1 | 6 | 6 | 5 |
| Example. 4 | 6 | 1 | 20 | 40 | 5 | 0 | 19 | 39 | 1 | 1 | 1 | 1 |
| Example. 5 | 3 | 3 | 26 | 54 | 3 | 1 | 25 | 54 | 0 | 2 | 1 | 0 |
| Example. 6 | 5 | 4 | 28 | 58 | 4 | 2 | 26 | 56 | 1 | 2 | 2 | 2 |
| Example. 7 | 2 | 0 | 20 | 40 | 2 | 0 | 20 | 39 | 0 | 0 | 0 | 1 |
| Example. 8 | 5 | 1 | 23 | 57 | 5 | 0 | 20 | 55 | 0 | 1 | 3 | 2 |
| Comparative Example 1 | 1 | 8 | 25 | 52 | 0 | 0 | 10 | 41 | 1 | 8 | 15 | 11 |
| Comparative Example 2 | 10 | 28 | 60 | 68 | 8 | 11 | 52 | 62 | 2 | 17 | 8 | 6 |

| | Tensile breaking strength in the longitudinal direction (MPa) | Physical properties of film after aging ||||
|---|---|---|---|---|---|
| | | Natural shrinkage rate (%) | Number of initial breakages | Shrinkage finish property | Label adhesiveness |
| Example. 1 | 150 | 0.8 | 0/10 | Good | Good |
| Example. 2 | 130 | 0.8 | 0/10 | Good | Good |
| Example. 3 | 140 | 1 | 0/10 | Good | Good |
| Example. 4 | 120 | 0.8 | 0/10 | Fair | Good |
| Example. 5 | 160 | 0.7 | 0/10 | Good | Good |
| Example. 6 | 135 | 1 | 0/10 | Good | Good |
| Example. 7 | 145 | 0.5 | 0/10 | Fair | Good |
| Example. 8 | 142 | 0.7 | 1/10 | Good | Good |
| Comparative Example 1 | 50 | 2.5 | 10/10 | Poor | Good |
| Comparative Example 2 | 150 | 1.5 | 0/10 | Good | Good |

INDUSTRIAL APPLICABILITY

The heat-shrinkable polyester film of the present invention has excellent properties after aging as describe above, thus it can be used suitably as a label application for bottles.

The invention claimed is:

1. A heat-shrinkable polyester film made of a polyester resin comprising 50% by mole or more ethylene terephthalate and containing at least 7 mol % of at least one monomer capable of forming an amorphous component in the whole component of the polyester resin, wherein the following requirements (1) to (5) are satisfied:
   (1) a glycerin shrinkage rate in the width direction is not more than 10% when the film is treated for 10 seconds in glycerin at 80° C.;
   (2) a glycerin shrinkage rate in the longitudinal direction is not less than 0% and not more than 10% and a glycerin shrinkage rate in the width direction is not less than 20% and not more than 40% when the film is treated for 10 seconds in glycerin at 100° C.;
   (3) a glycerin shrinkage rate in the width direction is not less than 40% and not more than 70% when the film is treated for 10 seconds in glycerin at 120° C.;
   (4) a shrinkage rate of the film in the width direction after aging for 672 hours under an atmosphere of a temperature of 60° C. and a relative humidity of 40% is not more than 1.5%; and
   (5) the number of initial breakages, which is the number of samples are broken at not more than 5% elongation when a tensile test is repeated 10 times in the film longitudinal direction using a tensile tester with a distance between chucks being kept at 100 mm after aging for 672 hours under an atmosphere of a temperature of 60° C. and a relative humidity of 40%, is not more than 2 times,
wherein the heat shrinkable polyester film is prepared by
   (a) a lengthwise drawing step of lengthwise drawing a undrawn film so as to provide a total lengthwise draw ratio of not less than 2.8 times and not more than 4.5 times by lengthwise drawing the film in the longitudinal direction at a draw ratio of not less than 2.2 times and not more than 3.0 times at a temperature of not less than Tg and not more than (Tg+30° C.) (first-stage lengthwise drawing) and then lengthwise drawing the film in the longitudinal direction at a draw ratio of not less than 1.2 times and not more than 1.5 times at a temperature of not less than (Tg+10° C.) and not more than (Tg+40° C.);

(b) an annealing step of relaxing the film after lengthwise drawing at a relaxation rate of not less than 10% and not more than 50% in the longitudinal direction while heating the film in the width direction using an infrared heater;

(c) an intermediate heat treatment step of heat-treating the film after annealing for a time period of not less than 1.0 seconds and not more than 9.0 seconds at a temperature of not less than 130° C. and not more than 190° C. with both edges in the width direction being held by clips in a tenter;

(d) a forced cooling step of actively cooling the film after the intermediate heat treatment until the surface temperature becomes a temperature of not less than 80° C. and not more than 120° C.;

(e) a transverse drawing step of drawing the film after forced cooling at a draw ratio of not less than 2.0 times and not more than 6.0 times in the width direction at a temperature of not less than (Tg+10° C.) and not more than (Tg+50° C.); and (f) a final heat treatment step of heat-treating the film after transverse drawing for a time period of not less than 1.0 seconds and not more than 9.0 seconds at a temperature of the transverse drawing temperature+not less than 15° C. and not more than 40° C. with both edges in the width direction being held by clips in a tenter.

2. The heat-shrinkable polyester film according to claim 1, wherein a tensile breaking strength in the longitudinal direction is not less than 80 MPa and not more than 300 MPa.

3. The heat-shrinkable polyester film according to claim 2, wherein a difference is not more than 10% between the glycerin shrinkage rate of the film in the width direction when the film is treated for 10 seconds in glycerin at each of temperatures of 80° C., 100° C. and 120° C. after aging for 672 hours under an atmosphere of a temperature of 60° C. and a relative humidity of 40% and the glycerin shrinkage rate at the same temperature for the film before aging.

4. The heat-shrinkable polyester film according to claim 3, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %.

5. The heat-shrinkable polyester film according to claim 4, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

6. The heat-shrinkable polyester film according to claim 3, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

7. The heat-shrinkable polyester film according to claim 2, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %.

8. The heat-shrinkable polyester film according to claim 7, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

9. The heat-shrinkable polyester film according to claim 2, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

10. The heat-shrinkable polyester film according to claim 1, wherein a difference is not more than 10% between the glycerin shrinkage rate of the film in the width direction when the film is treated for 10 seconds in glycerin at each of temperatures of 80° C., 100° C. and 120° C. after aging for 672 hours under an atmosphere of a temperature of 60° C. and a relative humidity of 40% and the glycerin shrinkage rate at the same temperature for the film before aging.

11. The heat-shrinkable polyester film according to claim 10, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %.

12. The heat-shrinkable polyester film according to claim 11, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

13. The heat-shrinkable polyester film according to claim 10, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

14. The heat-shrinkable polyester film according to claim 1, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %.

15. The heat-shrinkable polyester film according to claim 14, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

16. The heat-shrinkable polyester film according to claim 1, wherein the polyester resin contains 50 mol % or more of ethylene terephthalate unit, and the monomer capable of forming an amorphous component is at least one selected from neopentyl glycol, 1,4-cyclohexanedimethanol and isophthalic acid and is contained in an amount of not more than 27 mol %, and a glass transition point (Tg) is adjusted to 60 to 80° C.

17. A process for producing a heat-shrinkable polyester film comprising:
   (a) a lengthwise drawing step of lengthwise drawing a undrawn film so as to provide a total lengthwise draw ratio of not less than 2.8 times and not more than 4.5 times by lengthwise drawing the film in the longitudinal direction at a draw ratio of not less than 2.2 times and not more than 3.0 times at a temperature of not less than Tg and not more than (Tg 30° C.) (first-stage lengthwise drawing) and then lengthwise drawing the film in the longitudinal direction at a draw ratio of not less than 1.2 times and not more than 1.5 times at a temperature of not less than (Tg+10° C.) and not more than (Tg+40° C.);
   (b) an annealing step of relaxing the film after lengthwise drawing at a relaxation rate of not less than 10% and not more than 50% in the longitudinal direction while heating the film in the width direction using an infrared heater;
   (c) an intermediate heat treatment step of heat-treating the film after annealing for a time period of not less than 1.0 seconds and not more than 9.0 seconds at a temperature of not less than 130° C. and not more than 190° C. with both edges in the width direction being held by clips in a tenter;
   (d) a forced cooling step of actively cooling the film after the intermediate heat treatment until the surface temperature becomes a temperature of not less than 80° C. and not more than 120° C.;
   (e) a transverse drawing step of drawing the film after forced cooling at a draw ratio of not less than 2.0 times and not more than 6.0 times in the width direction at a temperature of not less than (Tg+10° C.) and not more than (Tg+50° C.); and
   (f) a final heat treatment step of heat-treating the film after transverse drawing for a time period of not less than 1.0 seconds and not more than 9.0 seconds at a temperature of the transverse drawing temperature+not less than 15° C. and not more than 40° C. with both edges in the width direction being held by clips in a tenter,
   wherein the heat-shrinkable polyester film made of a polyester resin comprising 50% by mol or more ethylene terephthalate and containing at least 7 mol % of at least one monomer capable of forming an amorphous component in the whole component of the polyester resin, wherein the heat-shrinkable polyester film satisfies the requirements (1) to (5) of claim 1.

18. A package, wherein the heat-shrinkable polyester film of claim 1 is used as a base material and a label provided with perforations or a pair of notches is attached on at least a part of the outer circumference and heat-shrunk.

* * * * *